United States Patent [19]

Yargeau

[11] 4,120,787
[45] Oct. 17, 1978

[54] FUEL CELL WATER CONDITIONING PROCESS AND SYSTEM AND DEAERATOR FOR USE THEREIN

[75] Inventor: Brian A. Yargeau, East Windsor Hill, Conn.

[73] Assignee: United Technologies Corporation, Hartford, Conn.

[21] Appl. No.: 755,336

[22] Filed: Dec. 29, 1976

[51] Int. Cl.² ............................ C02B 1/10; C02B 1/40
[52] U.S. Cl. ........................................ 210/26; 210/27; 210/167; 210/180; 210/181; 210/266; 429/17; 429/20
[58] Field of Search ................. 62/18, 31; 210/26, 27, 210/38 A, 71, 73 R, 180, 167, 181, 182, 184, 188, 258, 259, 266, 295; 429/17, 19, 20

[56] References Cited
U.S. PATENT DOCUMENTS

| | | |
|---|---|---|
| 3,266,938 | 8/1966 | Parker et al. ........................... 429/17 |
| 3,312,616 | 4/1967 | Ulmer et al. ........................... 210/26 |
| 3,454,491 | 7/1969 | Colburn ................................. 210/27 |
| 3,938,588 | 2/1976 | Coit et al. ............................. 210/180 |

Primary Examiner—Charles N. Hart
Assistant Examiner—Ivars Cintins

[57] ABSTRACT

Water produced as a by-product of the electrochemical reaction in a fuel cell is treated so as to enable its use to produce, in a fuel conditioning subsystem including a steam generator and raw hydrocarbon fuel reformer, fuel for delivery to the fuel cell. The water conditioning system includes a novel deaerator wherein fuel cell waste heat is employed to heat water produced in the fuel cell to remove dissolved gases therefrom. The water treatment system also includes a cooler for reducing the temperature of the "deaerated" water prior to its delivery to a filter and demineralizer; the water being delivered to the boiler of the steam generator subsequent to passage through the demineralizer.

23 Claims, 2 Drawing Figures

FUEL CELL WATER CONDITIONING PROCESS AND SYSTEM AND DEAERATOR FOR USE THEREIN

BACKGROUND OF THE INVENTION (1) Field of the Invention

The present invention relates to the removal of deleterious materials from a liquid, especially water, and particularly to the conditioning of water prior to its delivery to a steam generator. More specifically, the present invention is directed to a water conditioning system which removes dissolved gases, particulate matter and corrosives from water and to a novel deaerator for use in such a water conditioning system. Accordingly, the general objects of the present invention are to provide novel and improved methods and apparatus of such character.

(2) Description of the Prior Art

While not limited thereto in its utility, the present invention is particularly well suited for use in conjunction with an electrical power generator of the fuel cell type. Present commercial fuel cell power generators employ acid type fuel cells to which are delivered, as the reactant gases, air and hydrogen. As a consequence of the electrochemical reaction within the fuel cell, electricity and water are produced. The hydrogen fuel for the fuel cell power plant is, in a typical installation, produced in a commercially available subsystem known as a reformer by the reaction of water, in the form of steam, and a reformable hydrocarbon fuel such as natural gas. The water employed to generate the steam used in the reformer should be very clean and preferably should be free from dissolved carbon dioxide, carbon monoxide, nitrogen, chlorine and oxygen. This "feed" water should also be free of hydrogen sulfide, organics, particulate matter and many minerals. The presence of dissolved oxygen and carbon dioxide in feed water leads to boiler corrosion and the life of the steam generator of a fuel cell power plant can be maximized by use of feed water which is free from these dissolved gases. Similarly, any minerals which might deposit on the boiler heat transfer surfaces and thus reduce the heat transfer rate should preferably be removed from the boiler feed water. Those materials which might not have a deleterious effect on the boiler, such as sulphur and chlorine, but which could cause poisoning of the catalyst in the reformer should also be removed from the feed water.

It is known in the art that the water used for producing steam for the reformer of a fuel cell power plant may be condensed out of the exhaust gases from the fuel cell stack. This is considered desirable because it provides for a closed loop system thereby increasing the total fuel cell power plant efficiency and eliminating the need for an external source of water. Since materials which could contaminate the reformer and possibly also the fuel cell may be brought into the system with "outside" water, a closed loop system offers the advantage of assuring a supply of pure boiler feed water.

The prior art fuel cell based power plant systems have not employed the water produced in the fuel cell as boiler feed water because a suitable water conditioning system was not available to remove contaminates therefrom so as to produce a sufficiently clean boiler feed in an economical manner. Thus, previous proposals for employing the water vapor laden fuel cell stack cathode exhaust gases as a source of reformer steam generator feed water either required equipment which, because of its expense, would render the entire fuel cell power plant economically unattractive and/or required the use of an excessive amount of fuel or of the generated electrical power.

SUMMARY OF THE INVENTION

The present invention overcomes the above briefly discussed and other deficiencies and disadvantages of the prior art by providing a novel technique and apparatus for producing, from fuel cell exhaust gases, boiler feed water for delivery to a steam generator which provides steam to a raw fuel reformer. The present invention also relates to a novel deaerator for use in the aforementioned unique water conditioning system.

In accordance with the present invention, fuel cell stack cathode exhaust gases are employed as the source of heat for a deaerator whereby, in the deaerator tank, dissolved gases are driven from the water which is produced by routing the exhaust gases through a condenser. Thus, after being employed to heat water in the deaerator tank, the fuel cell stack cathode exhaust gases are passed through a condenser and the resulting water condensate is returned to the deaerator tank for heating. The deaerated water is thereafter cooled, passed through a particulate filter and a demineralizer, and then preferably preheated before delivery to the steam generator boiler. The steam produced in the boiler is delivered to the reformer wherein it causes the breakdown of the raw fuel and the production of hydrogen gases for delivery to the fuel cell. The requisite thermal energy input to the reformer and steam generator is derived from a burner wherein fuel cell exhaust gases are combusted. The same source of the cooling air employed in the condenser is utilized in the cooler through which the water drawn from the deaerator tank is passed prior to delivery to the filter and demineralizer; i.e., a single cooling fluid is used to provide cooling for the fuel cell, condenser and cooler. As noted, fuel cell waste heat extracted from the hot fuel cell stack cathode exhaust gases is used to heat the water in the deaerator.

Also in accordance with the invention, the deaerator comprises a novel heat exchanger where the amount of fuel cell waste heat transferred from the cell stack cathode exhaust gases to the water automatically varies with the amount of water in the deaerator tank. The deaerator includes a fuel cell stack cathode exhaust gas inlet manifold which delivers the hot gas to a plurality of heat transfer tubes which extend through the deaerator tank; these tubes sloping downwardly from their connections with the inlet manifold and being generally situated so as to be vertically spaced from one another within the deaerator tank. The gases are drawn off of the deaerator tank from a gas discharge manifold which is coupled to the condenser. The demand for water by the system boiler is controlled by the power level of the fuel cell, and the water level in the deaerator tank will increase and decrease automatically as will the amount of heat transfer thereto without the necessity of any external controls.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENT

Figure 1:
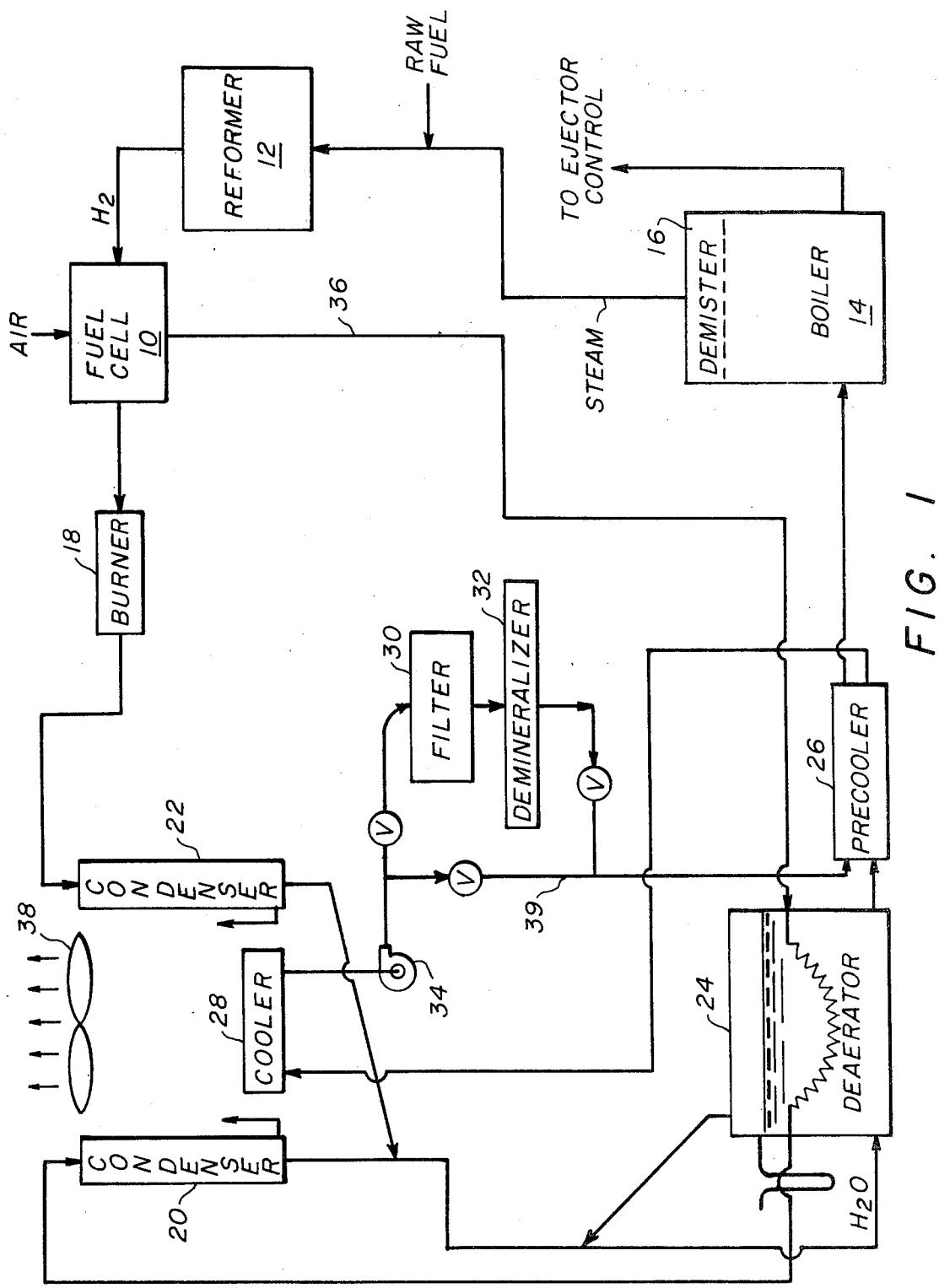
FIG. 1 is a functional block diagram of a water conditioning system in accordance with the present invention.

With reference now to FIG. 1, a conventional fuel cell is indicated generally at 10. Fuel cell 10 will include a cathode, an anode, an electrolyte interposed between the cathode and the anode, and means defining a hydrogen chamber adjacent the anode. In actual practice, fuel cell 10 will comprise a plurality of individual fuel cells connected in series. An oxidant, for example air, is delivered to the cathode of fuel cell 10 while the reactant gas, namely hydrogen, is delivered to the anode. As a result of the electrochemical reaction within fuel cell 10, electricity and water are produced. The water is entrained in hot air which is drawn off of the fuel cell in the form of fuel cell stack cathode exhaust gases. Unburned hydrogen fuel is also drawn from the fuel cell as a by-product of the electrochemical reaction therein.

The most efficient presently available manner of producing hydrogen fuel for delivery to the fuel cell anode consists of the breakdown of a hydrocarbon fuel in a device known as a reformer. In FIG. 1, a reformer is indicated generally at 12. As employed herein the term "reformer" refers to any conventional apparatus for generating hydrogen by the reaction of water and a reformable fuel. Reformers are typically operated in temperature ranges of from 800° to 1400° F. and the water delivered thereto will be in the form of steam produced by a boiler 14. A conventional demister 16 is included within boiler 14 to remove water droplets from the steam prior to its delivery to reformer 12.

The requisite heat for causing the boiling of water in boiler 14 and for operating reformer 12 is produced by burning, downstream of fuel cell 10, the hydrogen exhaust gas in a burner 18. Thus, burner 18 derives, from combustible material which would otherwise be wasted, thermal energy for operating reformer 12 and boiler 14.

As noted above, it would be desirable to employ, in a closed system, the water produced by fuel cell 10 as the feed for boiler 14. However, after condensation in the manner to be described below, the fuel cell produced water is high in dissolved oxygen and other gases which will cause corrosion of the metal boiler. Additionally, the fuel cell produced water will include, as a result of the reaction within fuel cell 10 and the action of the condenser, carbonic and phosphoric acid. In addition to causing boiler corrosion or the formation of deposits on heat transfer surfaces, these gases and acids, as well as any entrained solids, may be carried over into the steam delivered to the reformer and will cause poisoning of the catalyst in the reformer. The reformer or fuel conditioner poison tolerance limits require the delivery thereto of clean steam and, since boiler water impurities are entrained in the steam carry over, the boiler feed water must be pure. These requirements dictate the conditioning of the fuel cell produced water prior to delivery to the boiler in order to protect the boiler from deposits and corrosion and to minimize steam-borne reformer poisons.

In order to cause the requisite purification, the water conditioning system must remove all gaseous forms of impurities from the condensate comprising the fuel cell produced water and those solids which would have a deleterious effect on either the boiler or reformer must also be removed. In addition, in order that the entire power plant have the requisite efficiency, the water conditioning system must not require significant power for operation, its initial expense must be comparatively modest and it must be reliable and easy to service.

The water conditioning system of the present invention includes, in addition to the aforementioned demister 16 and boiler 14, a pair of condensers 20 and 22, a deaerator 24, a precooler 26 and a cooler 28, a filter 30, a demineralizer 32 and a pump 34 for circulating the condensate. Of these components the condensers, boiler and demister are customary elements of the fuel cell power plant.

The hot moisture laden air from the fuel cell stack cathode exhaust is first delivered via conduit 36 to the deaerator 24 wherein it gives up some of its heat to water within the deaerator tank. The deaerator 24 operates on the principal of raising the temperature of water delivered thereto near the boiling point thus driving off dissolved gases. The fuel cell exhaust, after passing through deaerator 24, is delivered to condenser 20. Condenser 20 is cooled by the same fan 38 which is employed to cool fuel cell 10 during operation. The exhaust gases are released to the atmosphere at condenser 20 and the condensate, which comprises the fuel cell produced water, is returned to deaerator 24 for heating.

The hot water drawn from the tank of deaerator 24 is first cooled. This cooling is required since the resins within the demineralizer 32 can not withstand excessive temperatures. As shown in FIG. 1, the cooling of the water from deaerator 24 is accomplished in a precooler 26 and a main cooler 28. Precooler 26, while not essential for operation, has proved to be advantageous and is in the form of a regenerative type heat exchanger. Cooler 28 is a conventional radiation type device which is exposed to the air currents established by fan 38. The water exiting from cooler 28 may, for example, be at a temperature of approximately 130° F.

Pump 34 may be a conventional centrifugal vane type pump which is intermittently operated in response to the level of water in boiler 14 in the manner known in the art. It is to be noted that the water conditioning system between the outlet of deaerator 24 and the inlet to boiler 14 must be closed so as to prevent gas pickup by the water. The physical location of pump 34 in the loop is not critical. However, increased pump life may be obtained by locating the pump immediately downstream of cooler 28 where the system temperature is low as shown.

The water from cooler 28 is treated in a filter 30 and a demineralizer 32. Filter 30 may comprise a conventional charcoal type filter which removes particulates, some minerals and chemical compounds. Demineralizer 32 may comprise a commercially available ion exchange device that removes dissolved salts and substitutes $H^+$ and $OH^-$ ions to thus form very pure, low conductivity water. The combined function of filter 30 and the demineralizer 32 is to provide protection from boiler deposit formation and reduce the amount of dissolved solids including fuel conditioner; i.e., reformer catalyst; poisons. Since both filter 30 and demineralizer 32 will include replaceable filters, it is desirable to provide valves and a by-pass conduit 39 as shown whereby operation of the system can be continued during the times the filter and demineralizer are being serviced.

The pure, comparatively cool, water from demineralizer 32 is again routed through precooler 26 wherein it is partially reheated. From precooler 26 the water is fed to boiler 14 wherein it is converted to steam, the steam is passed through demister 16, and the steam is supplied to the reformer 12.

It is to be noted that the exhaust from the burner 18 will be passed through condenser 22 and the water condensate added to the condensate from condenser 20 for delivery to deaerator 24.

To summarize the characteristics of the water conditioning system described above, the system accumulates water condensate in a water tank type deaerator. The water is deaerated by heating to near boiling at atmospheric pressure with the source of thermal energy being fuel cell waste heat. The water from the deaerator is delivered to the boiler via a solids removal subsystem. The requisite cooling apparatus located upstream of the solids removal subsystem may include a precooler which cools the water and prevents flashing. The solids removal subsystem, in the disclosed embodiment, includes a charcoal filter and a demineralizer. The water treatment system integrates with the fuel cell power plant and utilizes waste heat for deaeration and existing air flow for cooling in condensers 20 and 22 and cooler 28. Thus, the invention provides water conditioning to the fuel cell power plant at a very small increase in parasitic power since the condensers, fan and boiler are all presently part of the fuel cell power plant.

Figure 2:
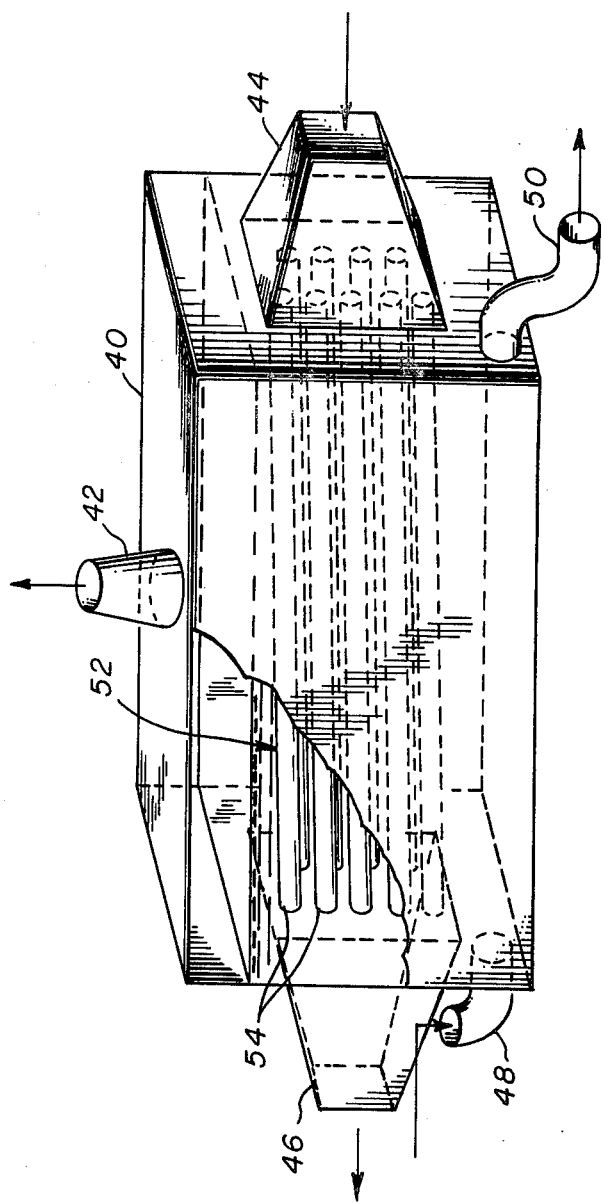
FIG. 2 is a perspective view, partially broken away, of a novel deaerator for use in the system of FIG. 1.

With reference to FIG. 2, a novel deaerator particularly well suited for incorporation in the system of FIG. 1 is shown. The deaerator of FIG. 2 consists of a heat exchanger built into a water tank for the purpose of heating water delivered to the tank thereby transferring thereto thermal energy extracted from a hot gas. A particular objective of the deaerator of FIG. 2 is to vary the heat transferred to the liquid within the tank as a function of the amount of liquid in the tank. This is accomplished by decreasing the heat transfer area of the heat exchanger as the level of water in the tank decreases; there being a water level below which there is no heat transfer. This is desirable because during certain fuel cell operating modes much heat is rejected with little water required by the reformer or being condensed.

The deaerator of FIG. 2 comprises a tank 40 having a vent 42 in the top thereof through which gases driven off of the water in the tank may be exhausted to the atmosphere. Tank 40 is provided with a gas inlet manifold 44 and a gas discharge manifold 46. Respectively located adjacent the bottom of the tank, usually at opposite sides thereof, are a condensate inlet conduit 48 and a boiler feed water withdrawal pipe 50. A heat exchanger, indicated generally at 52, is positioned within tank 40 and extends from the inlet manifold 44 to the discharge manifold 46. Heat exchanger 52 is comprised of a plurality of heat transfer tubes 54 having their opposite ends respectively coupled to the interior of the gas inlet and discharge manifolds. These heat transfer tubes are vertically staggered so as to be positioned over different levels of the deaerator tank. Additionally, the heat transfer tubes slope downwardly from the inlet manifold 44 to the discharge manifold 46.

In the prior art, when it was desired to vary the heat delivered to a liquid in a deaerator tank, a by-pass control was utilized. The use of a by-pass control, of course, increases the expense and complexity of the deaerator while simultaneously decreasing its reliability. In accordance with the present invention, because of the vertical staggering of the heat transfer tubes, the amount of fuel cell waste heat transferred from the cell cathode stack exhaust gases will be an automatic function of the level of water in the deaerator tank. In the fuel cell environment, the water level in tank 40 will decrease at power levels above half rated power because the boiler water demand exceeds the water condensation flow into the tank at these levels of power. With continued operation at power levels above half rated power, the level of water in tank 40 will fall below the bottom tube of the heat exchanger 52 thus eliminating the transfer of heat at high power levels and low water conditions.

While a preferred embodiment has been shown and described, various modifications and substitutions may be made thereto without departing from the spirit and scope of the invention. Accordingly, it is understood that the present invention has been described by way of illustration and not limitation.

What is claimed is:

1. A method for the treatment of fuel cell condensate, said method enabling the use of the condensate as feed water for a steam generator, the steam generator including a boiler and providing steam to a reformer which produces a fuel for the fuel cell from a raw material supplied thereto, said method comprising the steps of:
   transferring heat from fuel cell exhaust gases to water in a deaerator tank, dissolved gases being released from said water through the heating thereof, the fuel cell exhaust gases including water vapor;
   condensing the water from the exhaust gases subsequent to their use in heating water in the deaerator tank;
   delivering the condensate to the deaerator tank for heating;
   drawing water from the deaerator tank;
   cooling the water drawn from the deaerator tank;
   treating the cooled water to remove therefrom materials which would have a deleterious effect on the steam generator or reformer; and
   delivering the treated water to the boiler of the steam generator.

2. The method of claim 1 wherein the same coolant source is utilized in the steps of condensing and cooling.

3. The method of claim 2 wherein the step of treating comprises:
   filtering the water to remove particulates; and
   passing the filtered water through a demineralizer.

4. The method of claim 1 wherein the step of treating comprises:
   filtering the water to remove particulates; and
   passing the filtered water through a demineralizer.

5. The method of claim 4 wherein the step of cooling comprises:
   precooling the water in a regenerative heat exchanger; and
   further cooling the water by transferring heat to a gaseous coolant.

6. The method of claim 5 further comprising the step of:
   reheating the water before delivery to the steam generator and subsequent to treatment to remove deleterious materials by passing the water through the regenerative heat exchanger employed for precooling.

7. The method of claim 6 wherein the step of transferring heat to water in a deaerator tank includes:

varying the amount of thermal energy transfer as a direct function of the quantity of water in the deaerator tank whereby a decreased water level indicative of high fuel cell power output will be commensurate with decreased heat transfer from the exhaust gases to the water in the deaerator tank.

8. The method of claim 1 wherein the step of cooling comprises:
   precooling the water in a regenerative heat exchanger; and
   further cooling the water by transferring heat to a gaseous coolant.

9. The method of claim 8, wherein the same coolant source is utilized in the steps of condensing and further cooling.

10. The method of claim 9 further comprising the step of:
   reheating the water before delivery to the steam generator and subsequent to treatment to remove deleterious materials by passing the water through the regenerative heat exchanger employed for precooling.

11. The method of claim 1 further comprising the step of:
   reheating the water before delivery to the steam generator and subsequent to treatment to remove deleterious materials therefrom.

12. The method of claim 1 wherein the step of transferring heat to water in a deaerator tank includes:
   varying the amount of thermal energy transfer as a direct function of the quantity of water in the deaerator tank whereby a decreased water level indicative of high fuel cell power output will be commensurate with decreased heat transfer from the exhaust gases to the water in the deaerator tank.

13. In a fuel cell power plant, the power plant including a reformer for producing fuel for a fuel cell from hydrocarbon materials supplied thereto, the power plant additionally including a steam generator which supplies process steam to the reformer, improved apparatus for the purification of water produced as a by-product of the generation of electricity through an electrochemical reaction in the fuel cell, the water exiting the fuel cell in the form of water vapor entrained with hot exhaust gases, said improved water purification apparatus comprising:
   deaerator means, said deaerator means including a tank in which liquid is heated to drive off dissolved gases and a heat exchanger disposed in said tank;
   means for delivering moisture laden fuel cell exhaust gases to the heat exchanger of said deaerator means whereby fuel cell waste heat provides the requisite thermal energy for operation of said deaerator means;
   condenser means connected to said deaerator means and receiving exhaust gases passed through said heat exchanger, said condenser means condensing water from the fuel cell exhaust gases;
   means for delivering the condensate from said condenser means to the tank of said deaerator means;
   means for withdrawing water from said deaerator means tank, said withdrawing means including means for cooling the withdrawn water;
   means connected to said withdrawing means for removing contaminates from said cooled water, said contaminate removing means including a particulate filter; and
   means for delivering water passed through said contaminate removing means to the power plant steam generator.

14. The apparatus of claim 13 wherein said purification apparatus further comprises:
   regenerative heat exchanger means, water drawn from said deaerator means tank passing through said regenerative heat exchanger means prior to cooling and again passing through said regenerative heat exchanger means subsequent to passage through said contaminate removing means whereby water withdrawn from said deaerator tank means is precooled and water passed through said contaminate removing means is reheated;
   first conduit means for delivering water from said contaminate removing means to said regenerative heat exchanger means whereby purified and cooled water is returned to said regenerative heat exchanger means for reheating prior to delivery to said steam generator by said delivering means; and
   second conduit means for delivering reheated water from said regenerative heat exchanger means to said means for delivering water to the power plant steam generator.

15. The apparatus of claim 14 wherein said contaminate removal means comprises:
   a particulate filter; and
   a demineralizer, said filter and demineralizer being connected in series.

16. The apparatus of claim 14 further comprising:
   means establishing a flow of cooling air for said condenser means and said withdrawing means cooling means.

17. The apparatus of claim 16 wherein said withdrawing means comprises:
   pump means, connected downstream of said regenerative heat exchanger means; and
   a cooler connected in series with said pump means.

18. The apparatus of claim 17 wherein said contaminate removal means comprises:
   a particulate filter; and
   a demineralizer, said filter and demineralizer being connected in series.

19. The apparatus of claim 18 wherein said deaerator means comprises:
   a tank, said tank receiving condensate from said condenser means;
   a heat exchanger disposed in said tank, said heat exchanger including a plurality of parallel tubes, tubes of said plurality being vertically displaced with respect to one another within said tank;
   inlet manifold means, said inlet manifold means receiving the fuel cell exhaust gases, said first ends of said heat exchanger tubes being in fluid communication with the interior of said inlet manifold means; and
   discharge manifold means, said discharge manifold means being coupled to said condenser means, the second ends of said heat exchanger tubes all being in fluid communication with the interior of said discharge manifold means.

20. The apparatus of claim 19 wherein the first ends of said heat exchanger tubes are vertically displaced above the second ends of said tubes.

21. The apparatus of claim 14 wherein said deaerator means comprises:
   a tank, said tank receiving condensate from said condenser means;

a heat exchanger disposed in said tank, said heat exchanger including a plurality of parallel tubes, tubes of said plurality being vertically displaced with respect to one another within said tank;

inlet manifold means, said inlet manifold means receiving the fuel cell exhaust gases, said first ends of said heat exchanger tubes being in fluid communication with the interior of said inlet manifold means; and discharge manifold means, said discharge manifold means being coupled to said condensor means, the second ends of said heat exchanger tubes all being in fluid communication with the interior of said discharge manifold means.

22. The apparatus of claim 13 wherein said deaerator means comprises:

a tank, said tank receiving condensate from said condenser means;

a heat exchanger disposed in said tank, said heat exchanger including a plurality of parallel tubes, tubes of said plurality being vertically displaced with respect to one another within said tank;

inlet manifold means, said inlet manifold means receiving the fuel cell exhaust gases, said first ends of said heat exchanger tubes being in fluid communication with the interior of said inlet manifold means; and discharge manifold means, said discharge manifold means being coupled to said condenser means, the second ends of said heat exchanger tubes all being in fluid communication with the interior of said discharge manifold means.

23. The apparatus of claim 22 wherein the first ends of said heat exchanger tubes are vertically displaced above the second ends of said tubes.

* * * * *